(12) United States Patent
Leighton

(10) Patent No.: US 9,234,955 B2
(45) Date of Patent: Jan. 12, 2016

(54) REDUCED Q LOW FREQUENCY ANTENNA

(75) Inventor: Graham Richard Leighton, Essex (GB)

(73) Assignee: Roke Manor Research Limited, Romsey Hampshire (GB)

( * ) Notice: Subject to any disclaimer, the term of this patent is extended or adjusted under 35 U.S.C. 154(b) by 160 days.

(21) Appl. No.: 13/537,683

(22) Filed: Jun. 29, 2012

(65) Prior Publication Data

US 2013/0002512 A1    Jan. 3, 2013

(30) Foreign Application Priority Data

Jun. 29, 2011   (GB) .................................. 1111120.0

(51) Int. Cl.

| | | |
|---|---|---|
| *H01Q 7/00* | (2006.01) | |
| *H01Q 21/00* | (2006.01) | |
| *G01S 1/24* | (2006.01) | |
| *H01Q 7/08* | (2006.01) | |
| *H01Q 23/00* | (2006.01) | |
| *H04B 1/18* | (2006.01) | |
| *H01Q 21/30* | (2006.01) | |

(52) U.S. Cl.
CPC .................. *G01S 1/245* (2013.01); *H01Q 7/08* (2013.01); *H01Q 21/30* (2013.01); *H01Q 23/00* (2013.01); *H04B 1/18* (2013.01)

(58) Field of Classification Search
CPC ............ H01F 17/0006; H01F 17/0013; H01F 17/043; H01F 19/08; H01F 2003/005; H01F 2003/103; H01F 2007/1684; H01F 2007/1692; H01F 2007/185; H01F 2007/1888; H01F 2017/065; H01F 2019/085; H01F 2027/2809; H01F 2027/2857; H01F 2029/143; H01F 2038/143; H01F 21/04; H01F 27/2804; H01F 27/289; H01F 27/29; H01F 27/323; H01F 27/325; H01F 27/34; H01F 27/40; H01F 29/14; H01F 3/00; H01F 38/12; H01F 38/14; H01F 38/30; H01F 41/046; H01F 5/003; H01F 4/1607; H01F 7/1653; H01F 7/1844; H01G 7/06; H01J 37/32009; H01J 37/32082; H01J 37/32174; H01J 37/32357; H01J 37/32422; H01J 37/3266; H01J 37/32697; H01J 37/32862; H01J 37/32935; H01J 37/3299; H01J 49/105; H01J 65/044; H01J 65/046; H01L 23/645; H01L 23/66; H01L 27/0251; H01M 10/441; H01M 10/46; H01M 2/204; H01P 1/15; H01Q 1/2208; H01Q 1/243; H01Q 1/248; H01Q 1/273; H01Q 1/3233; H01Q 1/38; H01Q 1/46; H01Q 21/00; H01Q 21/24; H01Q 21/30; H01Q 23/00; H01Q 7/00; H01Q 7/005; H01Q 7/08; H01R 13/6658; H01R 13/7175; H01R 13/7197; H01R 23/6873; H01R 24/62; H02H 1/0007; H02H 3/006; H02H 3/105; H02J 7/0044; H02J 7/0047; H02J 7/025; H02K 21/24; H02K 24/00; H02K 3/02; H02K 3/12; H02K 3/28; H02K 3/47; H02K 3/505; H02K 35/02; H02K 41/035; H02K 49/106; H02K 51/00; H02K 53/00; H02K 57/006; H02K 7/06; H02K 7/106; H02K 7/1884; H02M 2001/0022; H02M 3/1582; H02M 3/33507; H02M 3/33523; H02M 3/337; H02P 25/027; H02P 8/08; H03D 13/004; H03F 2200/336; H03F 2200/537; H03F 2203/45008; H03F 2203/45101; H03F 2203/45362; H03F 2203/45492; H03F 2203/45586; H03F 3/16; H03F 3/193; H03F 3/45192; H03F 3/45197; H03F 3/45475; H03F 3/4565; H03F 3/602; H03G 1/0029; H03G 1/0088; H03G 3/3042; H03G 9/005; H03G 9/18; H03H 1/00; H03H 2001/005; H03H 2001/0057; H03H 2001/0085; H03H 2001/0092; H03H 3/00; H03H 7/0115; H03H 7/0153; H03H 7/075; H03H 7/09; H03H 7/1775; H03H 7/1783; H03H 7/1791; H03H 7/42; H03H 7/463; H03J 3/185; H03L 2207/06; H03L 7/087; H03L 7/099; H03L 7/0995; H03L 7/10; H03L 7/193; H03L 7/1976; H04B 1/12; H04B 1/123; H04B 1/18; H04B 1/28; H04B 1/30; H04B 1/44; H04B 1/48; H04B 10/58; H04B 10/693; H04B 5/0031; H04B 5/0081; H04B 5/0093; H04B 7/00; H04L 25/0266; H04M 1/00; H04M 1/72502; H04N 21/4382; H04N 5/23248; H04N 5/23258; H04N 5/23287; H04N 5/455; H04Q 9/00; H04R 1/06; H04R 3/00; H04R 3/002; H04R 31/00; H04R 5/04; H04R 9/02; H04R 9/025; H04R 9/045; H04R 9/06; H04R 9/063; H05B 33/0815; H05B 41/24; H05B 41/2806; H05B 41/2813; H05B 41/2824; H05B 41/2888; H05B 41/3921; H05B 41/3927; H05B 6/145; H05K 1/0231; H05K 1/0237; H05K 2201/09336
USPC .................................................. 343/867, 866
See application file for complete search history.

(56) References Cited

U.S. PATENT DOCUMENTS

| | | | | |
|---|---|---|---|---|
| 512,340 | A * | 1/1894 | Tesla | 336/222 |
| 2,113,157 | A * | 4/1938 | Landon et al. | 334/59 |
| 4,314,378 | A * | 2/1982 | Fowler et al. | 455/291 |
| 2007/0222695 | A1* | 9/2007 | Davis | 343/788 |
| 2008/0258731 | A1* | 10/2008 | Smith et al. | 324/322 |
| 2008/0259665 | A1* | 10/2008 | Brederlow et al. | 363/127 |

FOREIGN PATENT DOCUMENTS

| | | |
|---|---|---|
| EP | 1850475 | 10/2007 |
| EP | 2541680 A1 | 1/2013 |
| GB | 0217245 | 12/1925 |
| GB | 0748001 | 4/1956 |
| GB | 2169764 | 7/1986 |
| GB | 2300921 | 11/1996 |
| JP | 56-122510 | 9/1981 |
| JP | 56-122511 | 9/1981 |
| JP | 58015302 | 1/1983 |
| JP | 09018293 | 1/1997 |
| JP | 09232986 | 9/1997 |
| JP | 2007064814 | 3/2007 |
| JP | 2007251819 A | 9/2007 |
| JP | 2010016492 | 1/2010 |
| WO | 8002782 | 12/1980 |

OTHER PUBLICATIONS

Combined Search and Examination Report Under Sections 17 and 18(3) in GB1311844.3 dated Nov. 15, 2013.
Examination Report Under Section 18(3) in GB1211351.0 dated Nov. 15, 2013.
Search Report Under Section 17 in GB1111120.0 dated Oct. 11, 2011.
Further Search Report in GB1111120.0 dated Feb. 21, 2012.

* cited by examiner

*Primary Examiner* — Dameon E Levi
*Assistant Examiner* — Andrea Lindgren Baltzell
(74) *Attorney, Agent, or Firm* — Banner & Witcoff, Ltd.

(57) ABSTRACT

A rod antenna and antenna circuit are described which make use of negative feedback to reduce the Q of the antenna, but which also makes use of a different coil tapping arrangement to significantly reduce electric field susceptibility on the detected signal from the main coil as well as different biasing arrangements to reduce noise. More particularly, in some embodiments of the invention the main detector coil of the antenna has a centre tap that is AC grounded with signal taps then being taken from the opposite ends of the main coil, and being respectively fed to the inputs of a differential amplifier. The output of the differential amplifier is then fed to the magnetic circuit of the rod antenna via a second inductor winding that is magnetically coupled to the resonance circuit of the main antenna coil.

19 Claims, 7 Drawing Sheets

REDUCED Q LOW FREQUENCY ANTENNA

CROSS-REFERENCE TO RELATED APPLICATIONS

This application claims priority benefit to United Kingdom Patent Application No. 1111120.0, filed Jun. 29, 2011, which is hereby incorporated by reference.

TECHNICAL FIELD

The present invention relates to a rod antenna, and in particular a rod antenna which has reduced Q by making use of negative feedback.

BACKGROUND TO THE INVENTION AND PRIOR ART

Rod antennas are known in the art for the receipt of low frequency signals in the range typically of a few tens of kHz up to 1 to 2 MHz. A conventional low frequency rod antenna usually comprises a number of turns of wire on a former, the former usually being a ferrite rod. The coil forms an inductor and the antenna may be tuned to a particular frequency by adding a capacitor for example in parallel with the inductor so that the inductor and capacitor form a resonant circuit. However, the inductor-capacitor combination provides a frequency response with very high Q, which, whilst acceptable for the reception of narrow band signals, is not acceptable for the reception of wide band signals, where the bandwidth is a significant portion of the antenna centre frequency. For example, in the LORAN™ navigational system, the centre frequency is 100 kHz, but with a −20 dB bandwidth of 20 kHz. A rod antenna with high Q thanks to the inductor-capacitor resonant circuit may therefore not be suitable for receiving such a wideband signal.

It is known to reduce the Q in several ways. A conventional way is to add an additional resistor, but this has the effect of reducing the sensitivity of the antenna, and decreasing the signal to noise ratio. Another known technique is to apply negative feedback to the antenna magnetic circuit, by use of a secondary feedback coil. Such a technique is known from U.S. Pat. No. 2,787,704, but more particularly from U.S. Pat. No. 4,314,378, the arrangement of which is shown in FIG. 1.

As shown in FIG. 1, a parallel inductor-capacitor resonant tank circuit, wherein the inductor has a ferrite rod core M and provides an output via field effect transistor Q1 to the inverting input of an operational amplifier A1. Connected to the output of the amplifier A1 is inductor L2, which is magnetically coupled to the ferrite rod so that it responds to the same magnetic field as inductor L1. The turns of the inductor L2 are applied to the ferrite rod M in the same sense as inductor L1 so that the voltage applied to inductor L2 will produce a voltage on L1 that is in phase with the voltage on L2. Because of the inversion produced by operational amplifier A1, the magnetic field produced by the current in L2 will be 180° out of phase with the antenna detect signal 1 output from L1. The magnitude of the negative feedback can be controlled via a feedback resistor $R_f$.

The effect of the negative feedback on the Q of the rod antenna is to reduce the Q, but the sensitivity of the antenna is not reduced.

Whilst the prior art of record reduces sensitivity of the rod antenna to proximal components, it would be beneficial if such insensitivity could be increased. In addition, sensitivity of the antenna can also be increased by improvements aimed at reducing noise in the circuit.

SUMMARY OF THE INVENTION

Embodiments of the invention provide an improved rod antenna and antenna tank circuit which make use of negative feedback to reduce the Q of the antenna, but which also makes use of a different coil tapping arrangement to significantly reduce electric field susceptibility on the detected signal from the main coil and/or different biasing arrangements to reduce noise. More particularly, in some embodiments of the invention the main detector coil of the antenna has a centre tap that is AC grounded with signal taps then being taken from the opposite ends of the main coil, and being respectively fed to the inputs of a differential amplifier. The output of the differential amplifier is then fed to the magnetic circuit of the rod antenna via a second inductor winding that is magnetically coupled to the resonance circuit of the main antenna coil. The AC grounding of the centre of the main coil significantly reduces susceptibility of the coil to the electric field with attendant advantages of reducing E-field interference and proximity effects of other components, as well as preserving the radiation pattern of the antenna. In addition, in further embodiments of the invention improvements are made to the biasing circuitry of the antenna's tank circuit, and of the amplifier, and in particular through removing resistors from the AC circuit at the input, and having biasing provided to the circuit via an inductor. Investigations have also been undertaken to determine more optimal coil resistances, and front end buffer amplifiers between the antenna and the operational amplifier.

In view of the above, from one aspect there is provided rod antenna circuit comprising: a first antenna coil wound on a former, the coil providing first and second output connections at opposite ends of the coil; a differential amplifier having inverting and non-inverting inputs, the inverting input receiving a first signal derived from one of the first and second output connections, and the non-inverting input receiving a second signal derived from the other of the first and second output connections, the differential amplifier providing a differential output signal dependent upon the first and second signals; and a feedback coil magnetically coupled to the first antenna coil and arranged to be fed the differential output signal so as to provide negative feedback to the first antenna coil.

The use of the differential amplifier has the effect that electric field (E-field) rejection is provided within the common mode range of the differential amplifier. In this respect, whilst a rod antenna is predominantly a magnetic-field (H-field) antenna, an E-field is generated across the output of the antenna which can be susceptible from interfering E-fields from proximal components. However, by using the differential amplifier susceptibility to E-field interference is reduced.

In one embodiment the first antenna coil comprises a centre tap that is AC grounded. This has the effect of providing a balanced connection to the antenna coil, thus also reducing susceptibility to E-field. In addition, the centre tapped AC ground has the effect of tying the centre of the antenna to ground, so that the common mode voltage developed at the output of the antenna, taken from the opposite ends of the antenna coil can be kept within the common mode input range of the differential amplifier.

Where a centre tap is used, in one embodiment the first antenna coil comprises wound bifilar wire. With such an arrangement it becomes possible to ensure that there are the same numbers of turns in each half of the antenna coil either side of the centre tap.

In addition where a centre tap is used, in one embodiment biasing circuitry is further provided to provide a bias signal so as to bias the first and second signals to within the common mode range of the differential amplifier. In this way the signals received from the antenna can be kept within the input range of the differential amplifier whilst taking into account other biasing in the circuit.

In one embodiment a bias signal is provided to the first antenna coil from biasing circuitry via a first bias inductor. This allows for biasing of the antenna circuit without using resistors in the AC front end, which leads to an improvement in noise performance.

In one embodiment the feedback coil is wound on the same former as the antenna coil. This provides for easy and convenient magnetic coupling between the feedback coil and the antenna coil.

In one embodiment the feedback coil is over wound on the antenna coil. By winding the feedback coil over the antenna coil magnetic coupling is easily achieved as both coils are wound on the same former, and space savings may be made as a shorter former can be used.

In embodiments of the invention a first transistor arranged to receive an output signal from one of the first and second output connections of the first antenna coil and to generate the first signal in dependence thereon is provided, as well as a second transistor arranged to receive an output signal from the other of the first and second output connections of the first antenna coil and to generate the second signal in dependence thereon. The first and second transistors act as buffer amplifiers between the antenna coil and differential amplifier, preventing loading of the antenna which may affect the frequency of operation.

Preferably, the first and second transistors are field effect transistors. In this respect, the use of FETs provides improved noise performance.

In one embodiment a buffer amplifier may be provided at the output of the differential amplifier, the buffer amplifier arranged to isolate the feedback signal taken from the output of the differential amplifier from load changes in any subsequent circuitry.

Within some embodiments of the invention the advantage is obtained that the negative feedback results in a minima in noise performance at the centre frequency of the antenna. That is, minimum noise is obtained at the centre frequency, with noise (in pV/Hz) increasing with frequency either side of the centre frequency.

In one preferred embodiment, a plurality of rod antenna circuits as described above are provided, the antenna coils and feedback coils of the plurality of antenna circuits being magnetically coupled. This allows for an antenna with extended performance characteristics to be provided, that may, for example, provide for multi-frequency performance, or wide-band performance.

In this respect, in one embodiment, the respective antenna coils may be tuned to different frequencies. Depending on the frequencies chosen, either a multi-band or wideband, or both, frequency response may be obtained.

For example, in one embodiment the respective antenna coils are tuned to different frequencies that are sufficiently apart such that the bandwidths of the respective antenna coils do not substantially overlap, whereby a multi-frequency antenna is obtained. Alternatively, in another embodiment the respective antenna coils are tuned to different frequencies that are sufficiently close together such that the bandwidths of the respective antenna coils at least partially overlap, whereby a wide-band antenna is obtained. In a further example a combination of the frequencies may be chosen, to give multiple frequency wideband performance.

From another aspect, embodiments of the invention may also provide an antenna circuit, comprising: a plurality of sets of antenna circuitry, each set comprising an antenna coil wound on a former, feedback circuitry, and a feedback coil, the feedback coil being magnetically coupled to the antenna coil and arranged to be fed a feedback signal derived from the feedback circuitry so as to provide negative feedback to the antenna coil; wherein the antenna coils and the feedback coils of the plurality of sets of antenna circuitry are magnetically coupled; and wherein the antenna circuit comprises at least one output signal derived from one of the sets of feedback circuitry, the output signal providing a frequency response corresponding to the individual frequency responses of the plurality of sets of antenna circuitry. With such an arrangement an antenna with extended performance characteristics may be provided, that may, for example, provide for multi-frequency performance, or wide-band performance.

In embodiments according to this aspect, as with the previous aspect, the respective antenna coils may be tuned to different frequencies. Depending on the frequencies chosen, either a multi-band or wideband, or both, frequency response may be obtained.

For example, in one embodiment at least some of the respective antenna coils are tuned to different frequencies that are sufficiently apart such that the bandwidths of the respective antenna coils do not substantially overlap, whereby a multi-frequency antenna is obtained. Alternatively, in another embodiment at least some of the respective antenna coils are tuned to different frequencies that are sufficiently close together such that the bandwidths of the respective antenna coils at least partially overlap, whereby a wide-band antenna is obtained.

In a further example a combination of the frequencies may be chosen, where some of the antennas are tuned to frequencies close to a first desired frequency to give a wideband response about that first frequency, and others of the antennas are tuned to frequencies close to a second desired frequency to give a wideband response about that second frequency. In such an arrangement, the first and second desired frequencies may be such that the wideband responses about such frequencies do not substantially overlap. With such arrangements multiple frequency wideband antenna performance is obtained.

In one embodiment of the second aspect the feedback circuitry comprises an operational amplifier, and the output signal is derived from the output of one of the operational amplifiers. In this respect, the frequency response obtained at the single output is due to the individual frequency responses of the different sets of antenna circuitry combined together, and it is not necessary to take an output from each set of antenna circuitry and then electrically combine the signals.

DESCRIPTION OF THE DRAWINGS

Further features and advantages of the present invention will become apparent from the following description of embodiments thereof, presented by way of example only, and by reference to the accompanying drawings, wherein like reference numerals refer to like parts, and wherein:—

DESCRIPTION OF THE EMBODIMENTS

Figure 2:
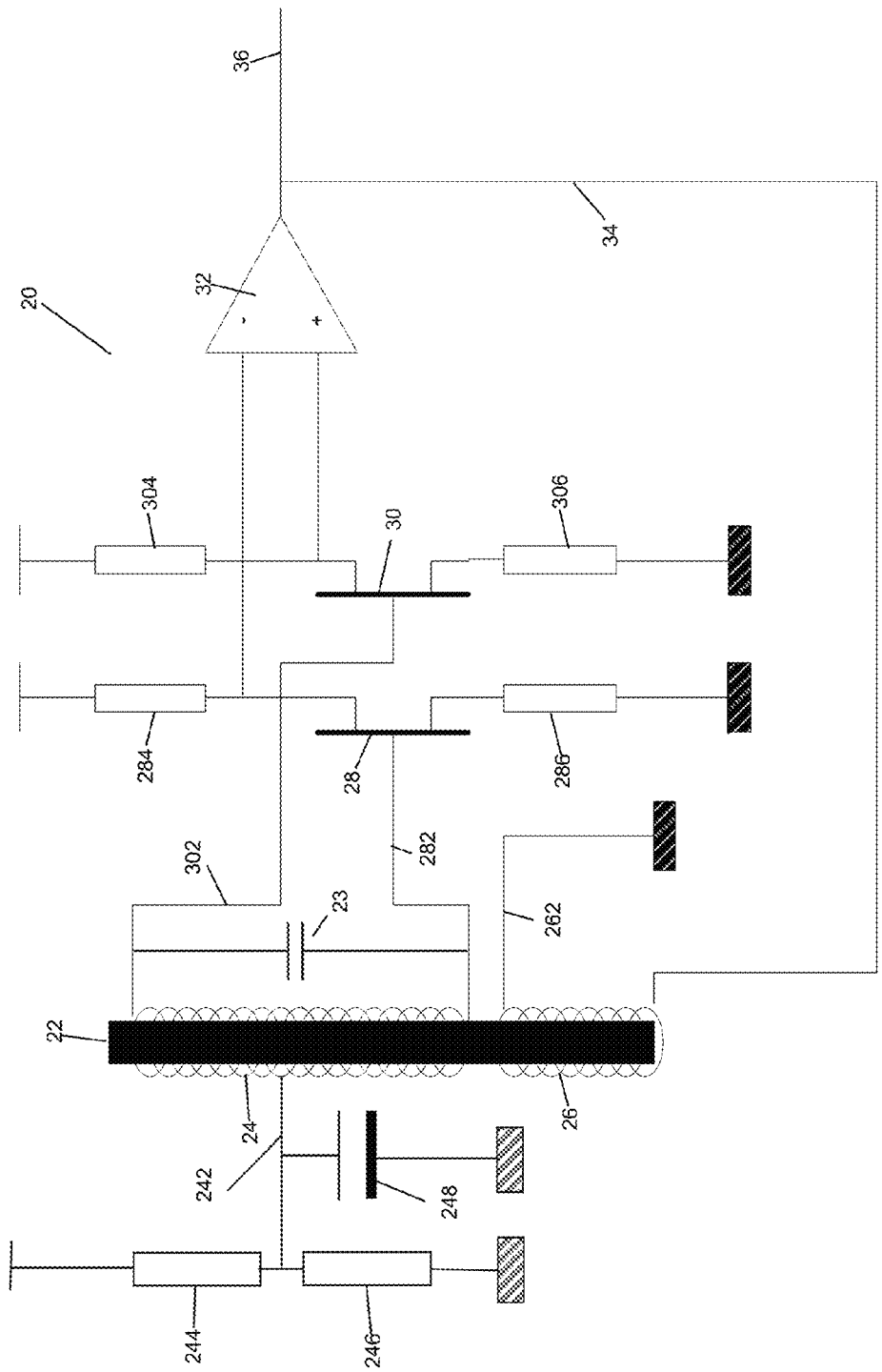
FIG. 2 is a circuit diagram of a rod antenna arrangement of an embodiment of the invention.

A first embodiment of the present invention is shown in FIG. 2. Here, a rod antenna circuit 20 is provided, comprising a former 22, such as a ferrite rod or the like, around which a first, main, antenna coil 24 is wound. In this embodiment the coil 24 has a centre tap 242 which is connected to an AC ground via AC grounding capacitor 248. The centre tap is DC biased via a divider formed from resistors 244 and 246. Outputs of the coil 24 are taken from opposite ends of the coil, with a first output line 302 feeding into the base (or gate) of a first transistor 30. A second output line 282 at the opposite end of the coil feeds a signal to the base (or gate) of a second transistor 28, via line 282. The first transistor 30 is provided with biasing resistors 304 and 306 respectively connected to the collector (drain) and emitter (source) of the transistor. Similarly, the second transistor 28 is also provided with biasing resistors 284 and 286, respectively connected to the collector (drain) and emitter (source) of the transistor.

The first transistor 30 provides an output at the collector (drain) to the non-inverting input of an operational amplifier 32. Similarly, the second transistor 28 provides an output signal from its collector (drain) into the inverting input of the operational amplifier 32. The operational amplifier 32 is configured to operate as a differential amplifier, where the output is dependent on the difference between the signals on the inverting and non-inverting inputs, and provides an output signal 36. The output 36 is also fed back via line 34 to a second coil 26 which is shown as formed on the same former 22. In this respect, whilst the coil 26 may not necessarily need to be on exactly the same former as the main coil 24, the coil 26 should at least be magnetically coupled to the magnetic circuit of the main coil 20 so that it responds to the same magnetic field as coil 24. The other end of coil 26 is connected via line 262 to an AC ground. Not shown in FIG. 2, but included in some embodiments is a variable resistor placed in series on the line 34, so as to be able to vary the amount of feedback that is fed to coil 26. Additionally typically provided would be a tuning capacitor 23 associated with the main coil 20, connected, for example, between the output lines 282 and 302, so as to allow the antenna to be tuned to a particular centre frequency. With the above arrangement, the negative feedback provided via the coil 24 has the effect of detuning the relatively high Q of the main coil 24 together with its tuning capacitor (not shown).

Additionally, the AC grounded centre tap of the main coil 24 together with the output of the coil being taken from both ends and then fed into a differential amplifier provides a balanced connection to the antenna, which provides a significantly improved response from the antenna, particularly with respect to electric field (E-field) sensitivity. In particular, the AC grounding of the centre of the coil significantly reduces E-field susceptibility which means that there is reduced E-field interference on the output of the antenna, and the AC grounding together with the DC biasing keeps the output signals within the common mode range of the differential amplifier. In addition, within the above arrangement all biasing resistors for transistors 28 and 30 have been removed from the AC connection to the main coil 24 of the antenna, and this leads to improvements in noise performance. In addition, as will be apparent from the embodiments described below, choice of transistor 28 and 30 can also improve the noise performance that is obtained.

Regarding noise performance, the feedback can be set at a level which creates an active, low noise, very wide band, H field antenna. The noise figure of the antenna is optimized at the natural resonant frequency of the rod and its tuning capacitance. Below this frequency the coupling response falls at the same rate as would a simple, un-tuned, loop i.e. 20 dB/decade. However, use of the feedback also provides for optimal noise at the desired tuned frequency, as well as reducing Q so as to widen the bandwidth of the antenna.

Figure 3:
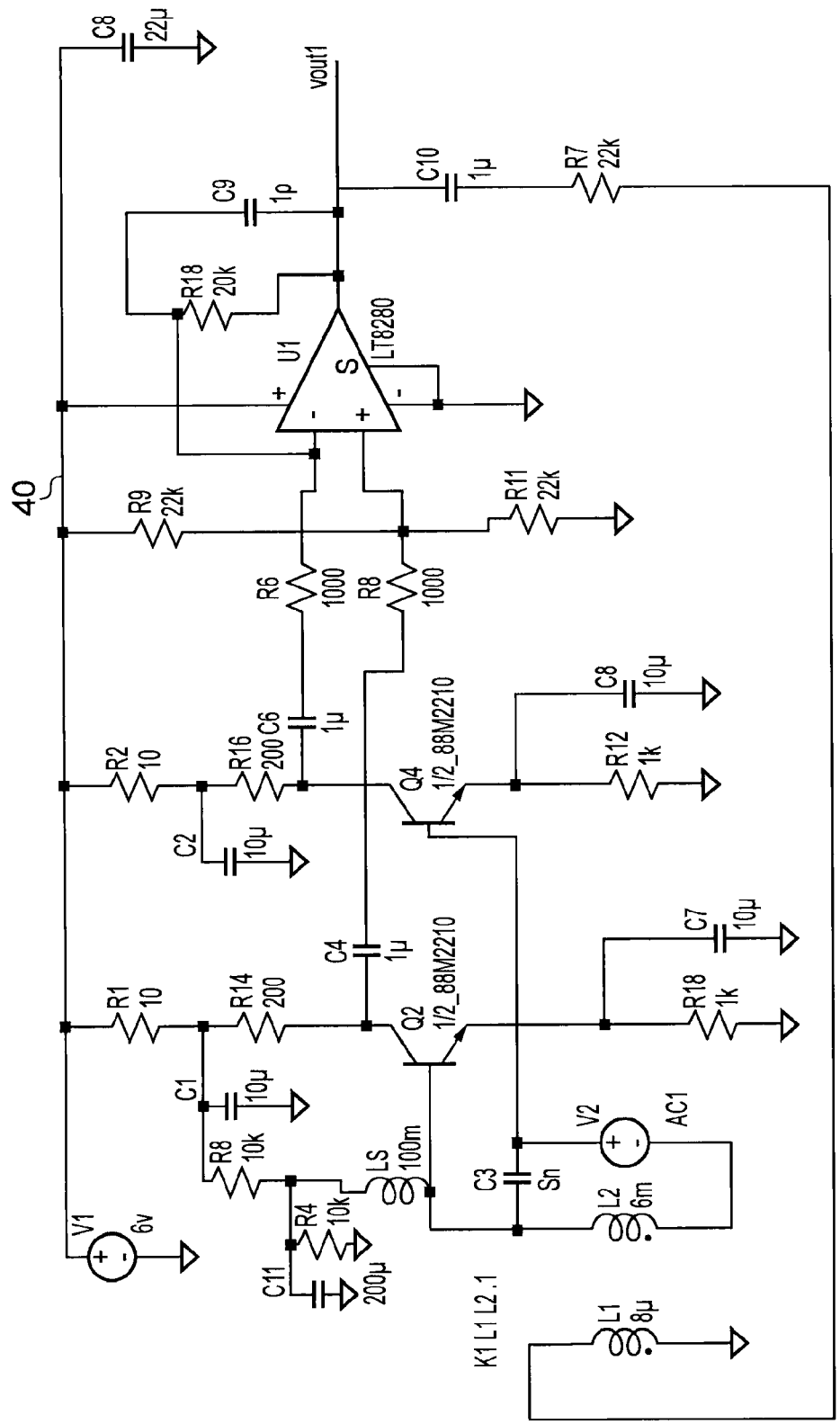
FIG. 3 is a circuit diagram of a further embodiment of the invention.

A second embodiment of the invention will now be described with respect to FIG. 3. More particularly, FIG. 3 illustrates a second embodiment of the present invention, wherein bipolar transistors Q8 and Q4 are used as the first and second transistors respectively. Inductor L2 acts as the main coil, and inductor L1 is a feedback coil magnetically coupled to the main coil, and connected to the output of differential amplifier U1 via resistor R7 and C10. Transistor Q8 receives a first signal from one end of the main coil L2 at its base, and is biased by resistors R1 and R14 in series with the collector, and resistor R18 in parallel with capacitor C7 at the emitter. Transistor Q4 receives a second signal from the other end of coil L2 at its base, and is biased by resistors R2 and R16 in series with the collector, and resistor R12 and capacitor C8 arranged in parallel at the emitter. The output from the collector of Q4 is input to the non-inverting input of the amplifier U1 via resistor R6 and capacitor C6 in series, whilst the output taken from the collector of transistor Q8 is input into the non-inverting input of amplifier U1 via capacitor C4 and resistor R8 in series. The response of amplifier U1 is controlled via a feedback loop comprising resistor R16 and capacitor C9 in parallel, connected between the output of the amplifier and the inverting input.

In contrast to the arrangement of FIG. 2, the circuit of FIG. 3 does not have a grounded centre tap on the main coil, and an inductor L8 is provided to feed bias to the front end, the biasing circuitry to produce the bias comprising a divider formed from resistors R4 and R8, and capacitor C11 arranged in parallel with resistor R4, the bias being fed from the divider tap via inductor L8 to the base of transistor Q8.

Regarding the noise performance of the bipolar arrangement of FIG. 3, through simulation noise performance figures were obtained that show that at the desired centre frequency of 121 kHz, 352.5 pV/Hz noise was obtained.

Figure 4:
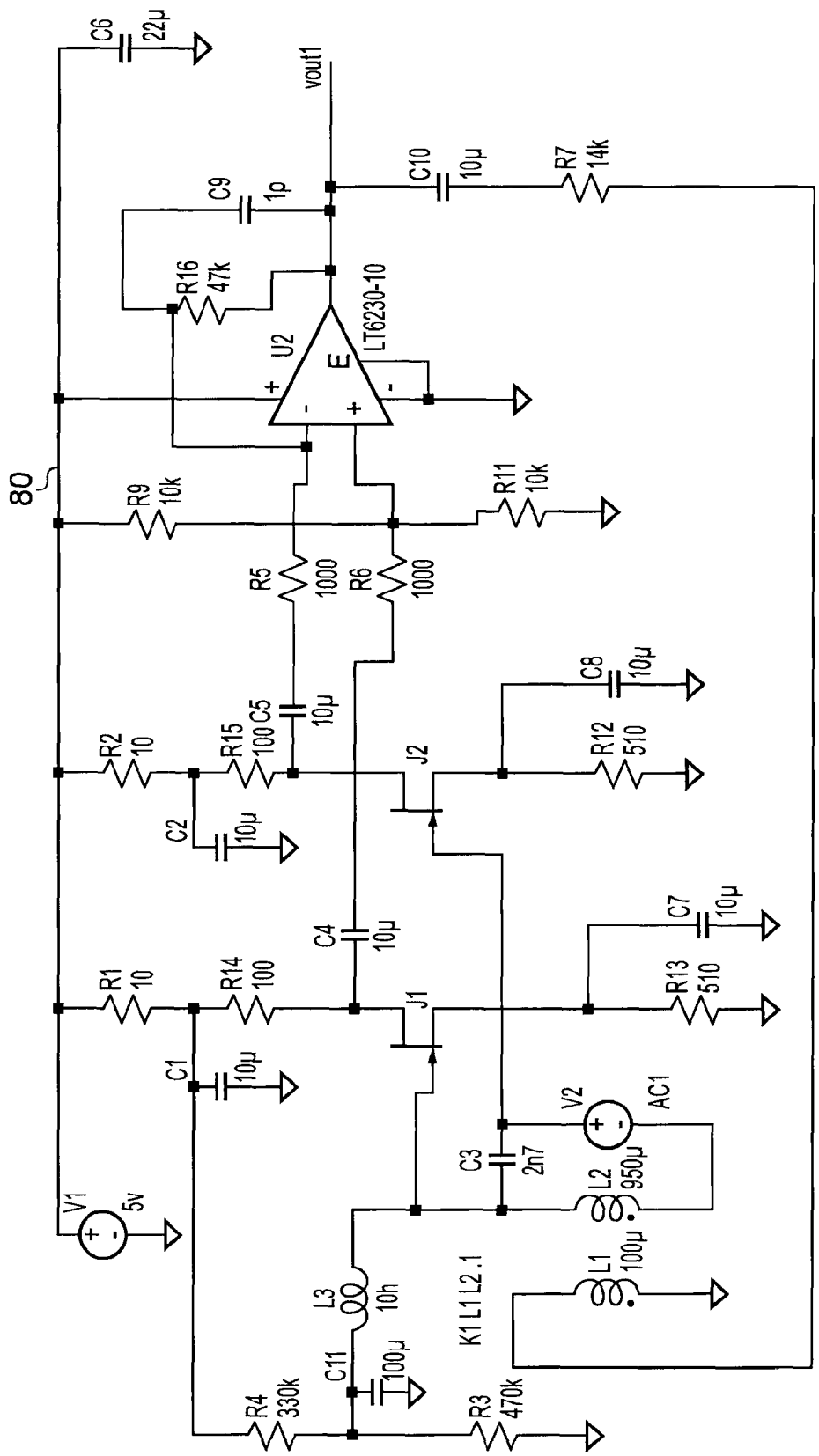
FIG. 4 is a circuit diagram of a third embodiment of the present invention.

In order to improve this noise performance, in a further circuit 80 of an embodiment of the invention shown in FIG. 4, the bipolar transistors Q4 and Q8 were replaced with field effect transistors J2 and J1 respectively, as shown in FIG. 4. Here, again circuit 80 comprises a main coil L2, which is magnetically coupled to a feedback coil L1. The front end bias voltage is provided via inductor L8, and field effect transistors J1 and J2 respectively receive inputs from either end of the main coil inductor L2. The output of FET J1 taken from the drain is input into the non-inverting input of amplifier U2, and the output of FET J2 taken from the drain is input into the inverting input of amplifier U2. FET J1 is biased by resistors R1, R14, and R18, and FET J2 is biased by resistors R2, R15, and R12. The input from J1 to the amplifier is via capacitor C4 and resistor R8, and from J2 via capacitor C6 and resistor R6 in series.

The amplifier U2, as previously, has a feedback loop in the form of parallel resistor capacitor combination R16 and C9, feeding the output back into the inverting input. The output is also fed via capacitor C10 and resistor R7 in series to one end of coil L1, with the other end of coil L1 being connected to AC ground.

The replacement of the bipolar transistors Q4 and Q8 of the circuit of FIG. 3 with the FETs improves the noise performance at the centre frequency. For example, at a centre frequency of 111 kHz a noise figure of 131.9 pV/Hz was obtained using Sanyo 2SK369 FETs, compared to the 352 pV/Hz for the bipolar arrangement. Thus a benefit of 8.5 dBs in signal-to-noise ratio over the bipolar design is obtained.

Further investigations have also been undertaken into varying the resistance of the main coil. In this respect, the circuit of FIG. 4 was used for simulation purposes, but with NXP BF862 FETs as FETs J1 and J2. The results of the investigations are shown in Table 1 below:

| Coil Resistance ($\Omega$) | Coil Dimensions | Noise Performance (pV/Hz @ 99.6 kHz) |
|---|---|---|
| 0 | 20 mm × 8 mm, 950 µH | 31.7 |
| 1.6 | 20 mm × 8 mm, 950 µH | 161 |
| 4.5 | 300 mm × 4 mm | 275.8 |

Figure 5:
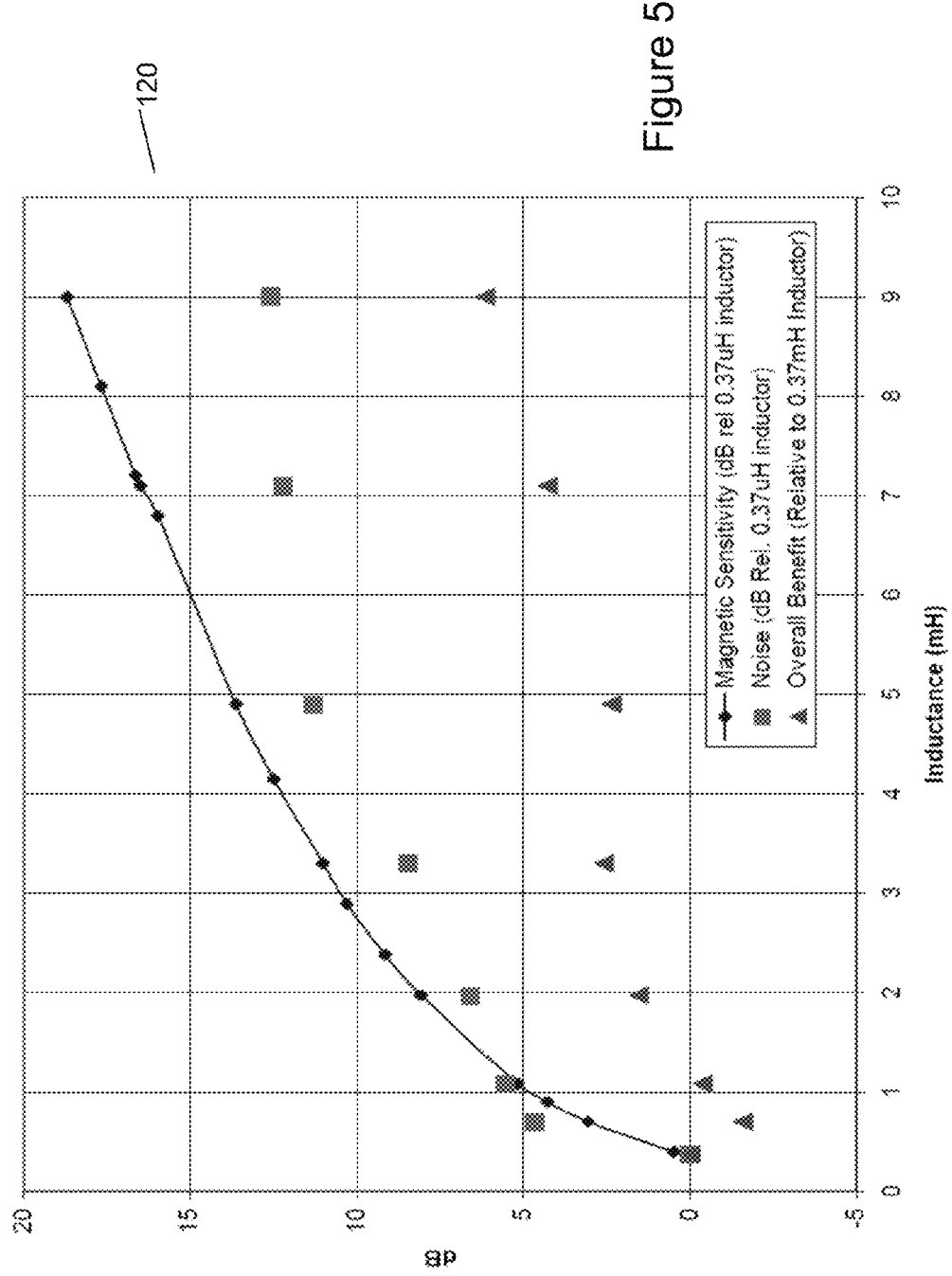
FIG. 5 is a graph illustrating the trade-off between noise and sensitivity for different coil inductances.

This difference in noise performance dependent on coil resistance indicates that there is a benefit trade-off between noise and sensitivity, and this trade-off is shown in FIG. 5. In particular, FIG. 5 plots the simulated noise, based on the resistance, and the relative sensitivity, based on magnetic sensitivity, for a range of RFID coils, available from, for example, COILCRAFT™, Inc. of Cary, Illinois. It shows that there are some values where the increase in sensitivity, due to increased turns, is more than offset by the increase in noise, due to coil resistance. For example, FIG. 5 shows that above an inductance of approximately 5 mH the increase in noise flattens off, whereas magnetic sensitivity tends to continue to increase. It may be concluded, therefore, that a larger coil provides better performance, subject to size constraints.

Figure 6:
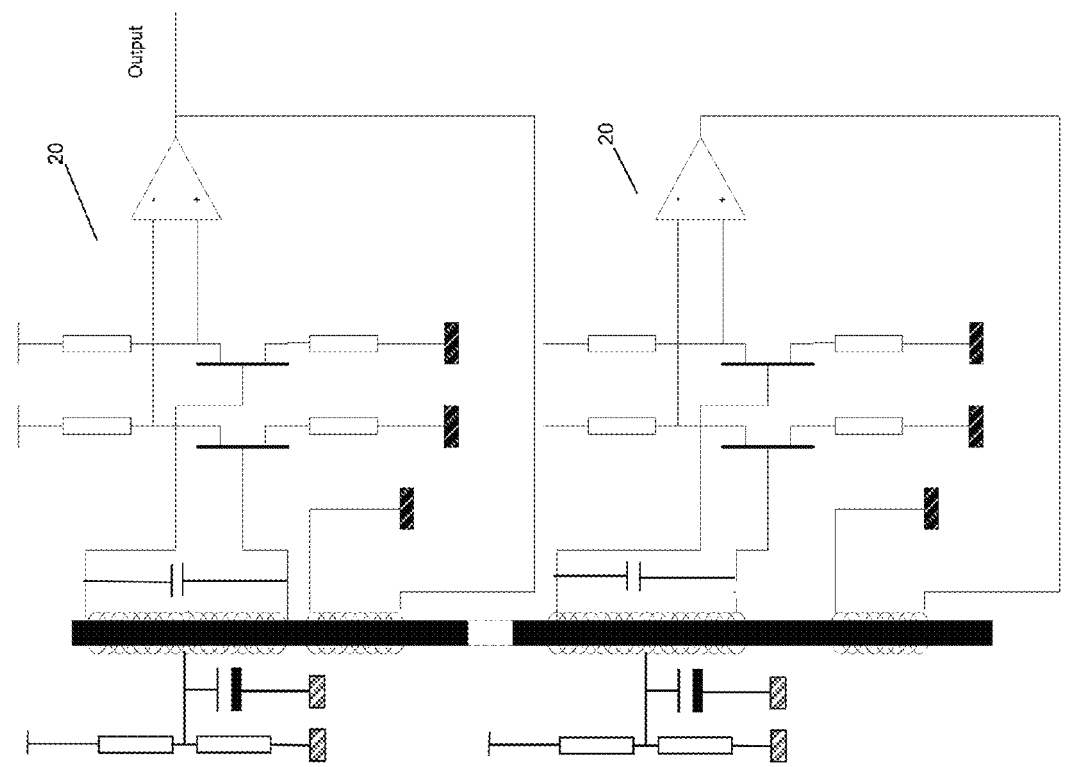
FIG. 6 is a circuit diagram illustrating a further embodiment of the present invention.

A final embodiment of the invention is shown in FIG. 6. Here it will be seen that two or more of the antenna circuit arrangements 20 described previously with respect to FIG. 2 may be provided, with respective antenna coils and feedback coils wound on the same former, or otherwise magnetically coupled in the same magnetic circuit, for example by being wound on separate formers which are magnetically coupled. Each of the sets 20 of antenna circuitry may have their respective antenna coils tuned to different frequencies, to provide for multi-frequency performance, or to provide for increased wideband coverage. Because of the magnetic coupling between the respective antenna windings, and their respective feedback windings, the output from the first amplifier has a response at the frequency expected from its own winding, and also one from the winding on the second circuit. This allows an antenna to be built with either responses at two (or more) frequencies, or to create a wideband response.

As noted, only a single output needs to be taken from one of the differential amplifiers, as shown, in order to obtain the multi-frequency or wide band performance. Moreover, if multiple outputs were needed, then outputs could be taken from respective differential amplifiers, with each output providing the same multi-frequency or wide-band performance, due to the magnetic coupling of the respective antenna coils and feedback coils.

Figure 7:
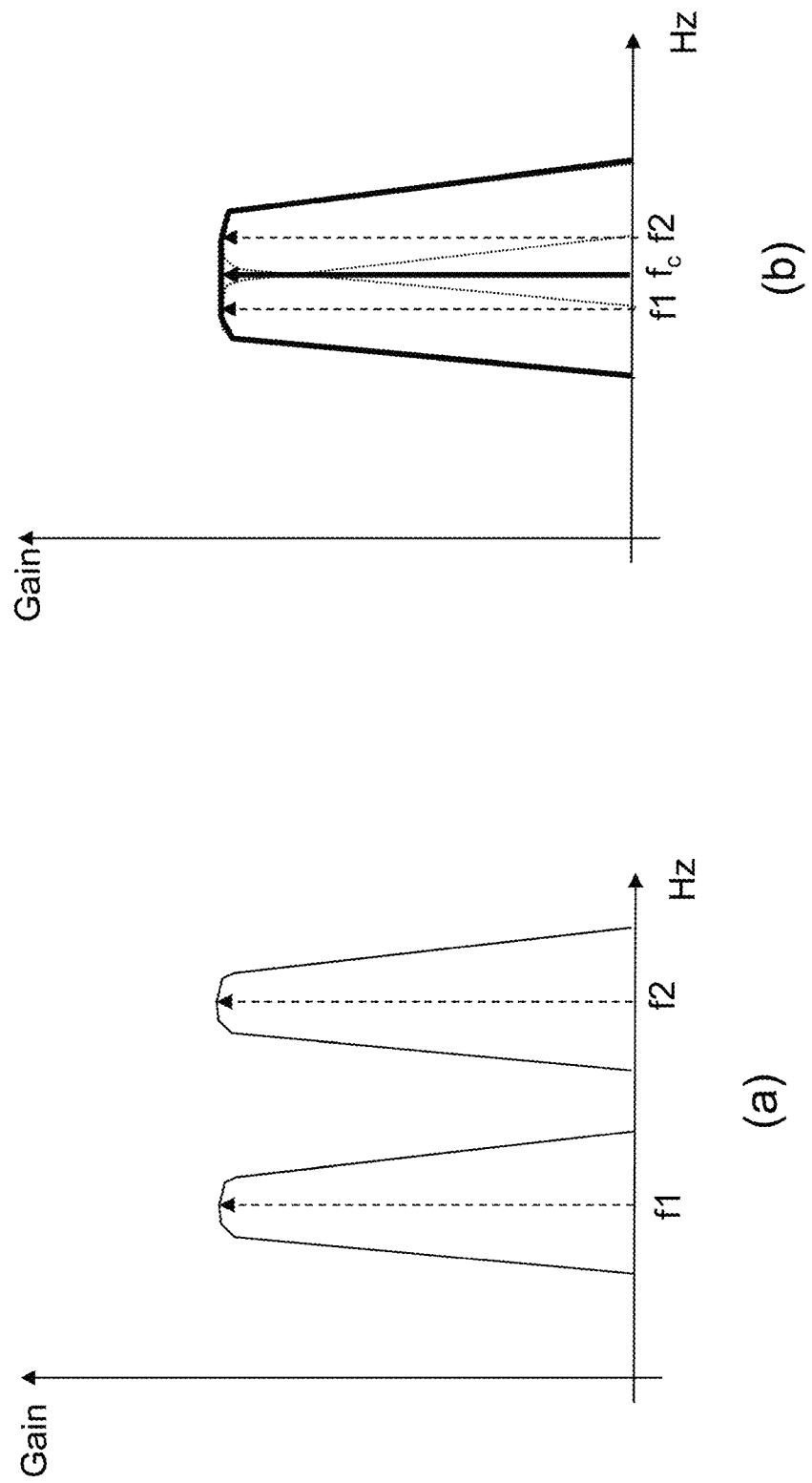
FIGS. 7(a) and (b) are diagrams illustrating example frequency responses of the further embodiment.

In order to obtain a multi-frequency antenna with such an arrangement, the respective antenna coils are tuned to the respective desired frequencies, which should be far enough apart that the bandwidths of the antennae do not substantially overlap, as shown in FIG. 7(a). Conversely, for wideband performance about a single desired center frequency, the respective antenna coils may be tuned to specific frequencies at or around the desired center frequency, for example to frequencies a small amount either side of the desired center frequency, and within the bandwidths of the respective antennas (which can themselves be broadened by flattening the Q with the feedback). In this way the resulting bandwidths of each antenna will overlap to a degree (depending on the precise tuned frequencies chosen, and the bandwidths), leading to a resultant increased overall bandwidth. FIG. 7(b) illustrates an example.

Figure 1:
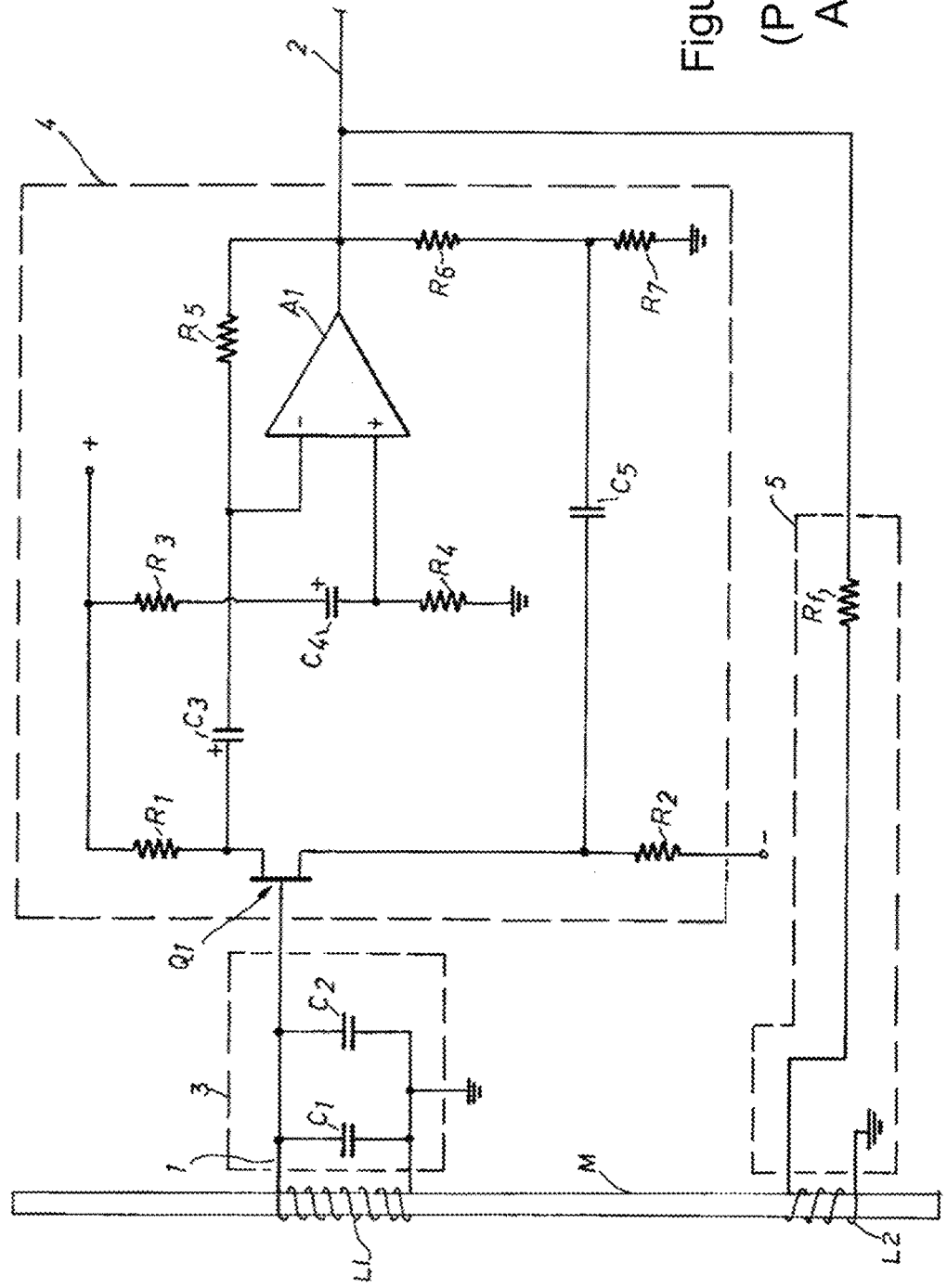
FIG. 1 is a circuit diagram of a negative feedback rod antenna arrangement of the prior art.

Note also that the above described multi-band or wideband arrangement is not limited to using the circuit of FIG. 2, as shown, and may use any of the other circuits described herein, in any combination. That is, each set 20 of antenna circuitry need not be identical, and different circuits may be used for each set. In this respect, in some embodiments of the invention the feedback circuit of FIG. 1 may be used as one or more of the sets.

Regarding implementation issues concerning physically implementing any of the circuits, although the feedback coil may be wound separately on the same former as the main coil, or another former provided it is magnetically connected to the main coil former, in practice it is more preferable for the feedback coil to be overwound on the main coil. This has the advantage of being more space efficient and requires a shorter former.

Additionally, although it is preferable to try and use large diameter wire to minimise the coil resistance, for example Litz wire (e.g. 60×0.02 mm), in practice the coils may be wound using bifilar wire, for example of 0.1 mm diameter, although of course other diameter wire may be used. The use of bifilar wire simplifies accurate winding of centre tapped coils, since both halves of the main coil can be wound together.

Regarding the material used for the former, a ferrite material is preferable, and in order to reduce the size of the rods whilst maintaining their magnetic sensitivity, higher permeability ferrites may be used. Example ferrite rods that may be used are RFID coils, such as those produced by Fair-Rite Products Corporation. These have a reduced diameter compared to other ferrite rods available, which is advantageous in reducing the length of winding wire and hence the winding resistance with a resultant reduction in the noise.

In conclusion, embodiments of the present invention provide an improved rod antenna circuit arrangement, which makes use of a main coil with signals sensed at either end of the coil being fed into the inputs of a differential amplifier. The output of the differential amplifier is then fed back to a feedback coil which is magnetically coupled to the magnetic circuit of the main antenna coil. Improvements in performance in embodiments of the invention can be used by making use of field effect transistors instead of bipolar transistors and by ensuring that no resistive biasing is present in the antenna tank circuit up to the input of the front end amplifiers. The effect of the negative feedback is to reduce the Q of the rod antenna so as to enable it to receive wide band signals such as, for example, a LORAN™ signal. In some embodiments the main coil has an AC grounded centre tap, and the AC grounding of the centre tap, together with the use of a differential amplifier to determine the difference between the signals obtained from either end of the main coil provides for a balanced connection to the antenna, which greatly reduces E-field susceptibility. This has the effect that the antenna may be packaged in a smaller package, closer to other components.

In preferred implementations the feedback coil is over-wound on the main coil, on the same former. In order to easily produce a centre tapped main coil, the main coil may be wound with bifilar wire.

In one embodiment a buffer amplifier may be added to the output of the differential amplifier. This provides an advantage by isolating the feedback from load changes in any subsequent circuitry to which the antenna circuit may be connected.

Various modifications may be made to any of the above embodiments to produce further embodiments, any and all of which are intended to be encompassed by the appended claims.

The invention claimed is:

1. A rod antenna circuit comprising:
a first antenna coil wound on a former, the first antenna coil providing first and second output connections at opposite ends of the first antenna coil, and the first antenna coil comprising a centre tap that is AC grounded via a capacitive coupling between the centre tap and an electrical ground;
a differential amplifier having inverting and non-inverting inputs, the inverting input receiving a first signal derived from one of the first and second output connections, and the non-inverting input receiving a second signal derived from the other of the first and second output connections, the differential amplifier providing a differential output signal dependent upon the first and second signals; and
a feedback coil magnetically coupled to the first antenna coil and arranged to be fed a feedback signal derived from the differential output signal so as to provide negative feedback to the first antenna coil.

2. A circuit according to claim 1, wherein the first antenna coil comprises wound bifilar wire.

3. A circuit according to claim 1, further comprising biasing circuitry to provide a bias signal so as to bias the first and second signals to within a common mode range of the differential amplifier.

4. A circuit according to claim 1, wherein a bias signal is provided to the first antenna coil from biasing circuitry via a first bias inductor.

5. A circuit according to claim 1, wherein the feedback coil is wound on the former.

6. A circuit according to claim 1, wherein the feedback coil is over wound on the first antenna coil.

7. A circuit according to claim 1, further comprising a first transistor arranged to receive an output signal from the one of the first and second output connections of the first antenna coil and to generate the first signal in dependence thereon, and a second transistor arranged to receive an output signal from the other of the first and second output connections of the first antenna coil and to generate the second signal in dependence thereon.

8. A circuit according to claim 7, wherein the first and second transistors are field effect transistors.

9. A circuit according to claim 1, further comprising a buffer amplifier at output of the differential amplifier arranged to isolate the feedback signal from load changes in any subsequent circuitry.

10. A circuit according to claim 1, wherein the negative feedback results in a minima in noise performance at a centre frequency of the first antenna coil.

11. An antenna circuit, comprising:
a plurality of rod antenna sub-circuits, a sub-circuit of the plurality having:
a first antenna coil wound on a former, the first antenna coil providing first and second output connections at opposite ends of the first antenna coil, and the first antenna coil comprising a centre tap that is AC grounded via a capacitive coupling between the centre tap and an electrical ground;
a differential amplifier having inverting and non-inverting inputs, the inverting input receiving a first signal derived from one of the first and second output connections, and the non-inverting input receiving a second signal derived from the other of the first and second output connections, the differential amplifier providing a differential output signal dependent upon the first and second signals; and
a feedback coil magnetically coupled to the first antenna coil and arranged to be fed a feedback signal derived from the differential output signal so as to provide negative feedback to the first antenna coil,
wherein the first antenna coil and the feedback coil are magnetically coupled.

12. The antenna circuit of claim 11, wherein each of the plurality of rod antenna sub-circuits comprise an antenna coil tuned to different frequencies.

13. The antenna circuit of claim 11, wherein each of the plurality of rod antenna sub-circuits comprise an antenna coil tuned to different frequencies that are sufficiently apart such that bandwidths of the respective antenna coils do not substantially overlap, whereby a multi-frequency antenna is obtained.

14. The antenna circuit of claim 11, wherein each of the plurality of rod antenna sub-circuits comprise an antenna coil tuned to different frequencies that are sufficiently close together such that bandwidths of the respective antenna coils at least partially overlap, whereby a wide-band antenna is obtained.

15. An antenna circuit, comprising:
a plurality of sets of antenna circuitry, each set comprising an antenna coil wound on a former, feedback circuitry, and a feedback coil, the feedback coil being magnetically coupled to the antenna coil and arranged to be fed a feedback signal derived from the feedback circuitry so as to provide negative feedback to the antenna coil, and the antenna coil comprising a centre tap that is AC grounded via a capacitive coupling between the centre tap and an electrical ground;
wherein the antenna coil and the feedback coil within each set of the plurality of sets of antenna circuitry are magnetically coupled; and
wherein the antenna circuit comprises at least one output signal derived from the feedback circuitry comprised in one of the sets, the at least one output signal providing a frequency response corresponding to individual frequency responses of the plurality of sets of antenna circuitry.

16. The antenna circuit of claim 15, wherein the respective antenna coils of the plurality of sets of antenna circuitry are tuned to different frequencies.

17. The antenna circuit of claim 15, wherein the respective antenna coils are tuned to different frequencies that are sufficiently apart such that bandwidths of the respective antenna coils do not substantially overlap, whereby a multi-frequency antenna is obtained.

18. The antenna circuit of claim 15, wherein the respective antenna coils are tuned to different frequencies that are sufficiently close together such that bandwidths of the respective antenna coils at least partially overlap, whereby a wide-band antenna is obtained.

19. The antenna circuit of claim 15, wherein the feedback circuitry comprises an operational amplifier, and the at least on output signal is derived from an output of the operational amplifier.

* * * * *